United States Patent Office 3,646,222
Patented Feb. 29, 1972

3,646,222
METHOD FOR PRODUCTION OF SUBSTITUTED HYDROQUINONES
Yutaka Kawamatsu, Suita, Osaka, Marekichi Sasaki, Yokohama, and Hiroshi Morimoto, Nishinomiya, Japan, assignors to Takeda Chemical Industries, Ltd., Osaka, Japan
No Drawing. Filed May 15, 1969, Ser. No. 825,031
Claims priority, application Japan, May 20, 1968, 43/33,898
Int. Cl. C07c *37/00, 41/00*
U.S. Cl. 260—613 D     7 Claims

ABSTRACT OF THE DISCLOSURE

A method for producing tetra-substituted hydroquinones of the formula $$\begin{array}{c} OH \\ R^1 \diagup\!\!\!\diagdown CH_3 \\ | \quad\quad | \\ R^2 \diagdown\!\!\!\diagup CH_2\text{—}CH\text{=}\overset{CH_3}{\underset{}{C}}\text{—}CH_2\text{—}R \\ OH \end{array}$$

wherein each of $R^1$ and $R^2$ is methyl or methoxy, or $R^1$ and $R^2$ represent, taken together

—CH=CH—CH=CH— and R represents a univalent radical of the formula:

$$-\!\!\left(\!CH_2\!-\!\underset{X}{CH}\!-\!\overset{CH_3}{\underset{Y}{C}}\!-\!CH_2\!\right)_{\!n}\!\!-\!H$$

wherein X and Y are each a hydrogen atom or, taken together, represent a double bond between the carbon atoms to which they attach, and $n$ is an integer from 0 to 9, is provided. A tri-substituted hydroquinone of the formula $$\begin{array}{c} OH \\ R^1 \diagup\!\!\!\diagdown CH_3 \\ | \quad\quad | \\ R^2 \diagdown\!\!\!\diagup \\ OH \end{array}$$

is condensed with a β-unsaturated alcohol of the formula $$HO\!-\!CH_2\!-\!CH\!=\!\overset{CH_3}{\underset{}{C}}\!-\!CH_2\!-\!R$$

or $$CH_2\!=\!CH\!-\!\overset{CH_3}{\underset{OH}{C}}\!-\!CH_2\!-\!R$$

in the presence of an N-sulfinyl compound.

---

This invention is concerned with a method for production of substituted hydroquinones. More concretely, this invention relates to a method for producing a tetra-substituted hydroquinone of the Formula I:

$$\begin{array}{c} OH \\ R^1\!\!-\!\!\diagup\!\!\!\diagdown\!\!-\!\!CH_3 \\ \quad\quad\quad\quad\quad\quad CH_3 \\ R^2\!\!-\!\!\diagdown\!\!\!\diagup\!\!-\!\!CH_2\!-\!CH\!=\!\overset{|}{C}\!-\!CH_2\!-\!R \\ OH \end{array} \quad\text{(I)}$$

wherein each of $R^1$ and $R^2$ is methyl or methoxy, or $R^1$ and $R^2$ represent, taken together

—CH=CH—CH=CH— and R represents a univalent radical of the formula:

$$-\!\!\left(\!CH_2\!-\!\underset{X}{CH}\!-\!\overset{CH_3}{\underset{Y}{C}}\!-\!CH_2\!\right)_{\!n}\!\!-\!H$$

wherein X and Y are each a hydrogen atom or, taken together, represent a double bond between the carbon atoms to which they attach, and $n$ is an integer from 0 to 9.

It has been known that the tetra-substituted hydroquinone of the general Formula I can be synthesized by the condensation of a tri-substituted hydroquinone of the formula:

$$\begin{array}{c} OH \\ R^1\!\!-\!\!\diagup\!\!\!\diagdown\!\!-\!\!CH_3 \\ | \quad\quad | \\ R^2\!\!-\!\!\diagdown\!\!\!\diagup \\ OH \end{array} \quad\text{(II)}$$

wherein $R^1$ and $R^2$ are of the same meaning as defined above, with a β-unsaturated alcohol of the formula:

$$HO\!-\!CH_2\!-\!CH\!=\!\overset{CH_3}{\underset{}{C}}\!-\!CH_2\!-\!R \quad\text{or}\quad CH_2\!=\!CH\!-\!\overset{CH_3}{\underset{OH}{C}}\!-\!CH_2\!-\!R$$

(IIIa)     (IIIb)

wherein R has the same meaning as defined above, in the presence of a Friedel-Crafts reaction catalyst.

However, the hitherto-known method affords only a poor rate of the desired condensation reaction and a high rate of undesirable side-reactions, and requires a long time and high cost for its isolation and purification from the reaction mixture, necessarily resulting in a poor yield of the objective product. These undesirable features of the known method seem to be due to the nature of the catalyst, and according to the observation of the present inventors, the so-called Friedel-Crafts reaction catalyst acts as a promotor of the polymerization of the β-unsaturated alcohol (III), and also attacks the starting tri-substituted hydroquinone (II) so as to make it impossible to recover the unreacted starting materials from the reaction mixture.

Although many attempts were made to overcome the aforesaid shortcomings and disadvantages, none, as far as the present inventors are aware, was entirely successful.

It has now been found by the present inventors that an N-sulfinyl compound has excellent properties as a condensing agent for the condensation reaction between the tri-substituted hydroquinone (II) and the β-unsaturated alcohol (III), rendering a fairly high conversion rate and neat reaction resulting in easy purification and an elevated yield of the product.

Therefore, it is the principal object of the present invention to provide a novel and industrially feasible method for the production of a tetra-substituted hydroquinone (I) by the use of a novel condensing agent, resulting in a high conversion ratio with a good yield of the objective hydroquinone.

It is another object of the invention to provide the tetra-substituted hydroquinone (I) of high purity with low cost in a short period of time.

It is to be noted that it has been established and well known among the artisans that the tetra-substituted hydroquinones of the Formula I can easily be oxidized under mild conditions to afford the corresponding quinones of the formula:

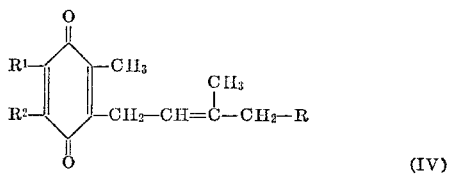

wherein $R^1$, $R^2$ and $R$ are of the same meaning as defined above. Said quinones are generally more stable than the corresponding hydroquinones (I), and include, for example, ubiquinones (i.e. $R^1$ and $R^2$=$OCH_3$;

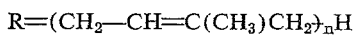

α-tocopherol precursor (i.e. $R^1$ and $R^2$=$CH_3$;

and its analogues, vitamin $K_1$ (i.e.

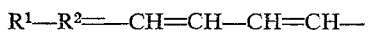

$R$=$(CH_2-CH_2-CH(CH_3)-CH_2)_3H$) and its analogues, vitamin $K_2$ (i.e.

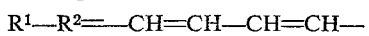

$R$=$(CH_2-CH=C(CH_3)-CH_2)_nH$, and the like, which are known to be vitamins or coenzymes and are useful as medicines or biochemical reagents.

Therefore, it is also an object of the present invention to provide an improved means for producing said tetra-substituted quinones of the Formula IV.

Said objects are primarily realized by subjecting a tri-substituted hydroquinone of the Formula II to condensation reaction with a β-unsaturated alcohol of the Formula IIIa or IIIb in the presence of an N-sulfinyl compound as the condensing agent and, when desired, subsequently subjecting the condensation product, i.e. tetra-substituted hydroquinone of the Formula I, to a mild oxidation in a conventional manner before the isolation.

It is known that an N-sulfinyl compound can be used direct as a raw material to obtain various adducts on account of its high reactivity. However, as far as the present inventors are aware, none has been reported on such an indirect function of the N-sulfinyl compound as only promoting an intermolecular condensation reaction as in the present invention.

The N-sulfinyl compound, which is used as a condensing agent in the method of this invention, is typically N-sulfinyl amine or N-sulfinyl sulfonamide.

The N-sulfinyl compound may have any of those common substituents which are exemplified by $-NO_2$, $-CN$, $-NSO$, $-SO_2NSO$, $-OR^4$, $-COOR^4$, $-COR^4$, $-Cl$, $-Br$ and the like, said $R^4$ being H or a hydrocarbon residue of up to 7 carbon atoms. It is to be noted that the N-sulfinyl compound is preferably one which intensifies the polarization of the

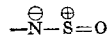

group. Therefore, an aromatic one, whether homocyclic or heterocyclic, generally gives better results than an aliphatic one, and it is preferable that an electrophilic group or groups, among those exemplified above, are present in the N-sulfinyl compound at a suitable position or positions. From the practical point of view, N-sulfinyl amine and N-sulfinyl sulfonamide are of a molecular weight of less than 500. These are exemplified by methyl-N-sulfinyl anthranilate, ethyl N-sulfinyl-p-aminobenzoate, N-sulfinyl-p-toluenesulfonamide, p-nitro-N-sulfinylaniline, N-sulfinylaniline, p-methoxy-N-sulfinyl-aniline, p-chloro-N-sulfinyl-aniline, N-sulfinyl-o-toluidine and the like.

The N-sulfinyl compounds can easily be prepared by reacting the corresponding amino compounds with thionyl chloride.

The β-unsaturated alcohol of the general Formula IIIa or IIIb can be exemplified by geraniol, farnesol, phytol, linalol, nerolidol and the like. Furthermore, if desired, the compounds corresponding to the above alcohols whose hydroxyls have been replaced by halogen, methoxy or acetyloxy group, may be employed.

While the molar ratio of the β-unsaturated alcohol of the Formula IIIa or IIIb relative to the tri-substituted hydroquinone (II) should vary with the type of the N-sulfinyl compound, the reaction temperature and the type of the solvent, it is generally preferable to employ about 2 to 4 mols per mole of the tri-substituted hydroquinone (II).

The amount of the N-sulfinyl compound, varying with the reaction condition, is generally about 1 to 5, practically 1 to 2 moles per mole of the hydroquinone (II).

Though the reaction may proceed without a solvent, it is preferably carried out in the presence of a suitable solvent which does not disturb the reaction. Such solvent can be exemplified by lower alcohols (e.g. methyl alcohol, ethyl alcohol, propyl alcohol, isopropyl alcohol, etc.), ethers (e.g. ethyl ether, dioxane, tetrahydrofuran, etc.), aromatic hydrocarbons (e.g. benzene, toluene, xylene, etc.) or a mixture thereof.

Generally, the reaction proceeds smoothly at a room temperature (about 10° to 30° C.). However, it may be carried out with cooling or heating, so as to control the reaction velocity. In case of heating, the reaction temperature is to be kept below about 110° C. in order to avoid undesirable side reactions otherwise to follow.

The reaction may be carried out in the air, but is preferably carried out in an atomsphere of an inert gas (e.g. nitrogen, helium, argon, etc.) to prevent oxidation of the substituted hydroquinones (I).

While the reaction time varies with the reaction conditions, generally speaking, the reaction goes to completion within several hours.

After the reaction, the reaction mixture is partitioned into an organic layer (such as ether, hexane, benzene, ligroin etc.) and an acidic aqueous layer containing the condensing agent. The organic layer containing the tetra-substituted hydroquinone (I) is concentrated, then dissolved in ether, passed over a column of adsorbent such as alumina, magnesium silicate or sodium alumino-silicate, eluted with a suitable solvent, e.g. a mixture of 5 to 10 volume percent hexane in ether to give the purified tetra-substituted hydroquinone (I) with a good yield and recover the unreacted tri-substituted hydroquinone (II) with excellent recovery ratio. In many cases, the ratio of the recovered tri-substituted hydroquinone (II) relative to the unreacted is more than 95%, and the unreacted hydroquinone (II) thus recovered is again used as the starting material. That is to say, taking the consumed tri-substituted hydroquinone (II) into account, the reaction yield is very excellent in the method of this invention.

Not only the purified tetra-substituted hydroquinone (I), but also the reaction mixture containing the tetra-substituted hydroquinone (I) can be per se applied to the mild oxidation to obtain the corresponding quinone (IV).

This oxidation can be carried out in any of conventional means for the conversion of a hydroquinone to the corresponding quinone. Thus, use can be made of the process involving the employment of such oxidizing agents as ferric salt (e.g. ferric chloride), manganese dioxide, silver oxide, etc. The air oxidation method is an alternative.

After the oxidation reaction, the quinone (IV) can be separated by a per se known procedure.

However, when the reaction mixture containing the tetra-substituted hydroquinone (I) without purification was applied to oxidation, the above described chromotography should be applied to separate the quinone (IV). In this case, the recovery ratio of quinone corresponding to the tri-substituted hydroquinone (II) is also excellent.

Following are presently preferred illustrative embodiments of this invention. In these examples, the parts by weight bear the same relationship to parts by volume as do grams to milliliters.

EXAMPLE 1

In 1,000 parts by volume of dioxane is dissolved 184 parts by weight of 2,3-dimethoxy-5-methylhydroquinone, followed by the addition of 197 parts by weight of methyl N-sulfinyl-anthranilate.

The mixed solution is stirred at room temperature, and a mixture of 500 parts by volume of geraniol and 1,000 parts by volume of dioxane is added. After the addition is complete, the mixture is heated for 4 hours to proceed a condensation. After cooling, the reaction mixture is poured in 5,000 parts by volume of a 10% solution of ferric chloride in ethanol, followed by vigorous shaking. The solution is poured in 2,000 parts by volume of water, and the mixture is extracted with three 10,000 parts by volume portions of ether. The extracts are combined and washed with three 10,000 parts by volume portions of water. After a dehydration over anhydrous sodium sulfate, the ether is distilled off and the residue is chromatographed on a column packed with 10,000 parts by weight of silica gel. As the solvent, use is made of a mixed solvent of n-hexane: ether (9:1 by volume). The above procedure yields 96 parts by weight (yield 30.0%) of a red-orange oil of 2,3-dimethoxy-5-methyl-6-geranyl-1,4-benzoquinone.

*Elementary analysis.*—Calculated for $C_{19}H_{26}O_4$ (percent): C, 71.67; H, 8.23. Found (percent): C, 71.57; H, 8.37.

Ultraviolet absorption spectrum $\lambda_{max.}^{EtOH}$: 275 m$\mu$ ($E_{1cm.}^{1\%}=412$)

EXAMPLE 2

In 1,000 parts by volume of dioxane is dissolved 92 parts by weight of 2,3-dimethoxy-5-methylhydroquinone, followed by the addition of 300 parts by weight of ethyl N-sulfinyl-p-aminobenzoate. To this solution, a mixture of 300 parts by weight of phytol and 1,000 parts by volume of dioxane is added in the same manner as in Example 1. The resulting mixture is further treated as in Example 1 to obtain 49 parts by weight (yield 21.3%) of 2,3-dimethoxy - 5 - methyl-6-phytyl-1,4-benzoquinone as orange-red oil.

*Elementary analysis.*—Calculated for $C_{29}H_{48}O_4$ (percent): C, 75.60; H, 10.50. Found (percent): C, 75.43; H, 10.41.

Ultraviolet absorption spectrum $\lambda_{max.}^{EtOH}$: 275 m$\mu$ ($E_{1cm.}^{1\%}=301$)

EXAMPLE 3

In 2,000 parts by volume of dioxane is dissolved 348 parts by weight of 2-methyl-1,4-naphthohydroquinone, followed by the addition of 500 parts by weight of ethyl N-sulfinyl-p-aminobenzoate. To this solution, a mixture of 1,000 parts by weight of phytol and 3,000 parts by volume of dioxane is added as in Example 1. Further treating the mixture in the same manner as in Example 1 yields 288 parts by weight (32.0%) of 2-methyl-3-phytyl-1,4-naphthoquinone as a yellowish oil.

*Elementary analysis.*—Calculated for $C_{31}H_{46}O_2$ (percent): C, 82.61; H, 10.29. Found (percent): C, 82.73; H, 10.28.

Ultraviolet absorption spectrum $\lambda_{max.}^{EtOH}$: 248 m$\mu$ ($E_{1cm.}^{1\%}=410$)

EXAMPLE 4

In 3,000 parts by volume of dioxane is dissolved 174 parts by weight of 2-methyl-1,4-naphthohydroquinone, followed by the addition of 300 parts by weight of N-sulfinyl-p-toluenesulfonamide. To this solution, a mixture of 500 parts by weight of phytol and 3,000 parts by volume of dioxane is added over 3 hours in nitrogen gas streams. After the addition is complete, the mixture is heated for 1 hour, and then allowed to cool. The reaction mixture is then treated in the same manner as in Example 1, to yield 130 parts by weight (28.9%) of 2-methyl-3-phytyl-1,4-naphthoquinone as a yellowish oil.

EXAMPLE 5

In 2,000 parts by volume of dioxane is dissolved 500 parts by weight of 2,3,5-trimethylhydroquinone, followed by the addition of 1,000 parts by weight of methyl N-sulfinylanthranilate. To the solution, a mixture of 1,400 parts by weight of phytol and 2,000 parts by volume of dioxane is added in nitrogen streams at room temperature over a period of 2 hours, under constant stirring.

After the addition is complete, the mixture is heated for 3 hours. After cooling, the reaction mixture is treated in the same manner as in Example 1. The procedure yields 517 parts by weight (36.8%) of 2,3,5-trimethyl-6-phytyl-1,4-benzoquinone as a yellowish orange oil.

*Elementary analysis.*—Calculated for $C_{29}H_{48}O_2$ (percent): C, 81.25; H, 11.29. Found (percent): C, 81.04; H, 11.00.

Ultraviolet absorption spectrum $\lambda_{max.}^{EtOH}$: 266 m$\mu$ ($E_{1cm.}^{1\%}=401$)

EXAMPLE 6

In 1,000 parts by volume of dioxane is dissolved 184 parts by weight of 2,3-dimethoxy-5-methylhydroquinone, followed by the addition of 153 parts by weight of p-nitro-N-sulfinylaniline. To this solution, a mixture of 600 parts by volume of geraniol and 1,000 parts by volume of dioxane is added at 100° C. over a period of 1 hour, under constant stirring. After the addition is complete, the mixture is heated for 1 hour and, after cooling, it is treated in the same manner as in Example 1 to obtain 2,3-dimethoxy-5-methyl-6-geranyl-1,4-benzoquinone as a reddish-orange oil.

What is claimed is:

1. A method for producing a tetra-substituted hydroquinone of the formula:

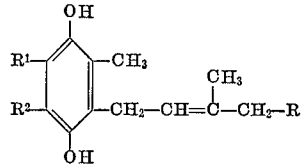

wherein each of $R^1$ and $R^2$ is methoxy or methyl, or $R^1$ and $R^2$, taken together, represent

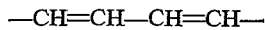

—CH=CH—CH=CH— and R represents a univalent radical of the formula:

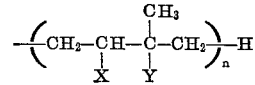

wherein X and Y represent each a hydrogen atom, or taken together, a double bond between the carbon atoms, to which they attach; which comprises subjecting a tri-substituted hydroquinone of the formula:

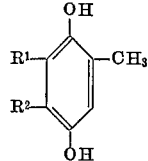

wherein $R^1$ and $R^2$ are of the same meaning as defined above, to a condensation with a $\beta$-unsaturated alcohol of the formula:

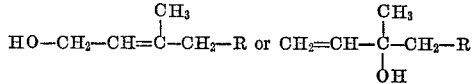

wherein R has the same meaning as defined above, in the presence of an N-sulfinyl amine or N-sulfinyl sulfonamide compound as condensing agent.

2. The method according to claim 1, wherein $R_1$ and $R_2$ are methoxy.

3. The method according to claim 1, wherein $R_1$ and $R_2$ are methyl.

4. The method according to claim 1, wherein $R_1$ and $R_2$, taken together, represent —CH=CH—CH=CH—.

5. The method according to claim 1, wherein the β-unsaturated alcohol is phytol.

6. The method according to claim 1, wherein the β-unsaturated alcohol is geraniol.

7. The method according to claim 1, wherein the N-sulfinyl compound is of a molecular weight less than 500.

References Cited

UNITED STATES PATENTS

| 3,080,384 | 3/1963 | Kofler | 260—396 |
| 3,118,914 | 1/1964 | Gloor et al. | 260—396 |
| 3,213,114 | 10/1965 | Braxton et al. | 260—396 |
| 3,517,070 | 6/1970 | Gloor et al. | 260—613 |

LORRAINE A. WEINBERGER, Primary Examiner

V. GARNER, Assistant Examiner

U.S. Cl. X.R.

260—396 R, 396 K, 625